Dec. 13, 1966    G. C. MAYER    3,291,233
WEIGHING APPARATUS
Original Filed May 24, 1966    6 Sheets—Sheet 2

INVENTOR
GERALD C. MAYER
BY    *Norris & Bateman*
ATTORNEYS

Dec. 13, 1966 G. C. MAYER 3,291,233
WEIGHING APPARATUS
Original Filed May 24, 1966 6 Sheets-Sheet 5

INVENTOR
GERALD C. MAYER
BY Norris & Bateman
ATTORNEYS

Dec. 13, 1966  G. C. MAYER  3,291,233
WEIGHING APPARATUS
Original Filed May 24, 1966  6 Sheets-Sheet 4

INVENTOR
GERALD C. MAYER
BY Norris & Bateman
ATTORNEY

Dec. 13, 1966  G. C. MAYER  3,291,233
WEIGHING APPARATUS

Original Filed May 24, 1966  6 Sheets-Sheet 5

INVENTOR
GERALD C. MAYER
BY Norris & Bateman
ATTORNEY

Dec. 13, 1966  G. C. MAYER  3,291,233
WEIGHING APPARATUS
Original Filed May 24, 1966  6 Sheets-Sheet 6

INVENTOR
GERALD C. MAYER
BY Norris D. Bateman
ATTORNEY

United States Patent Office 3,291,233
Patented Dec. 13, 1966

3,291,233
WEIGHING APPARATUS
Gerald C. Mayer, Wayne, N.J., assignor to Howe Richardson Scale Company, Clifton, N.J., a corporation of Delaware
Filed June 11, 1965, Ser. No. 463,317
18 Claims. (Cl. 177—81)

This application is a continuation-in-part of my co-pending application Serial No. 327,280, filed on December 2, 1963, for Weighing Apparatus now U.S. Patent No. 3,252,531.

This invention relates to weighing apparatus and more particularly to an automatic batch weighing apparatus wherein successive drafs of fluent or particulate material to be weighed are each fed in a continuous stream to a beam supported scale hopper.

Typically, weighing apparatus of a type to which the present invention relates comprises a fulcrumed weigh beam which supports a weigh hopper and a counterweight on opposite sides of the beam fulcrum. Material to be weighed is fed to the hopper, and when the load applied to the hopper approaches a weight that balances out the counterweight, the feed is automatically cut off by a catch gate or other suitable means. This type of weighing machine is basically a pre-weigher inasmuch as the weighment obtained is essentially predetermined by the counterweight on the beam and its position relative to the beam fulcrum. Accordingly, the accuracy of such pre-weighing machines is determined by the difference between the actual weight fed to the hopper and the desired pre-selected weight.

With conventional weighing machines of the type described above it is not possible to consistently weigh out the pre-selected weight in repetitive batch weighing operations. Rather, the weight of the batches will be either underweight or overweight depending upon various factors especially including variations in the flow rate of the material being fed to the scale hopper. As a result, it is frequently necessary to manually adjust the feed rate or the cut-off point at which the material feed is interrupted in conventional machines in order to maintain the weight of each batch within an acceptable weight range. Manual adjustments, however, cause objectionable delays in rapidly batch weighing successive loads in addition to requiring the time-consuming, alert presence of an operator.

Accordingly, a major object of this invention is to provide a novel batch weighing apparatus which automatically compensates for deviations in the weight of batches of material from a preselected weight. In comparison with prior proposals, the apparatus of this invention is simplified, is inexpensive to manufacture, is highly reliable in operation, and delivers weighments having an average weight which is very close to the desired, preselected weight.

More specifically, it is an object of this invention to provide for a novel batch weighing apparatus which automatically controls the cut-off of material being fed to a scale to compensate for weight deviations from a preselected range.

Another more specific object of this invention is to provide for a novel batch weighing apparatus having a pre-weigher for weighing out pre-selected weights of material and a checkweigher for post weighing the batches of material weighed out by the pre-weigher to provide a feed back signal for automatically adjusting the cut-off of material being fed to the pre-weigher to compensate for deviations from a pre-selected weight range.

In conventional batch weighing machines, the weighments unavoidably vary at random in underweight and overweight directions from a desired, pre-selected weight owing to conglomerate errors and inconsistencies resulting from the operation of all the various components of the machine. As a result, it is desirable to make compensative adjustments for weight deviations only when an overweight or underweight trend is detected.

Accordingly, a further important object of this invention is to provide a batch weighing apparatus with a novel compensating feedback control system which corrects for weight deviations only when an overweight or underweight trend is detected in a pre-determined number of consecutive drafts.

Another important object of this invention is to provide a novel control unit for adjustably actuating a material feed cut-off gate in response to predetermined movement of a weighbeam forming part of the scale to which the material is being delivered. In accordance with this invention, the control unit comprises a magnetically actuatable proximity switch which is actuated by a magnet movable with the weighbeam to operate the material cut-off gate. A D.C. electro-magnetic coil contained in the proximity switch is energizable to apply a bias to the switch to aid or oppose its magnetic actuation depending upon the polarity of the energizing current. As a result, the actuating of the cut-off gate is either delayed or advanced to correspondingly increase or decrease the weight of the draft.

Further objects will appear as the description proceeds in connection with the appended claims and the annexed drawings wherein:

In its preferred embodiment, this invention incorporates the separate motor driven material feeding mechanisms for full flow and dribble flow as described in the aforesaid copending application Serial No. 327,280. It will be appreciated, however, that the apparatus of this invention may incorporate any conventional batch-weighing or pre-weighing machine of the type having a movable, load supporting weigh beam. It also will be appreciated that the invention herein is applicable to weighing apparatus having no dribble feed and also to apparatus employing a gravity material feed instead of a motor driven feeding mechanism.

Figure 1:
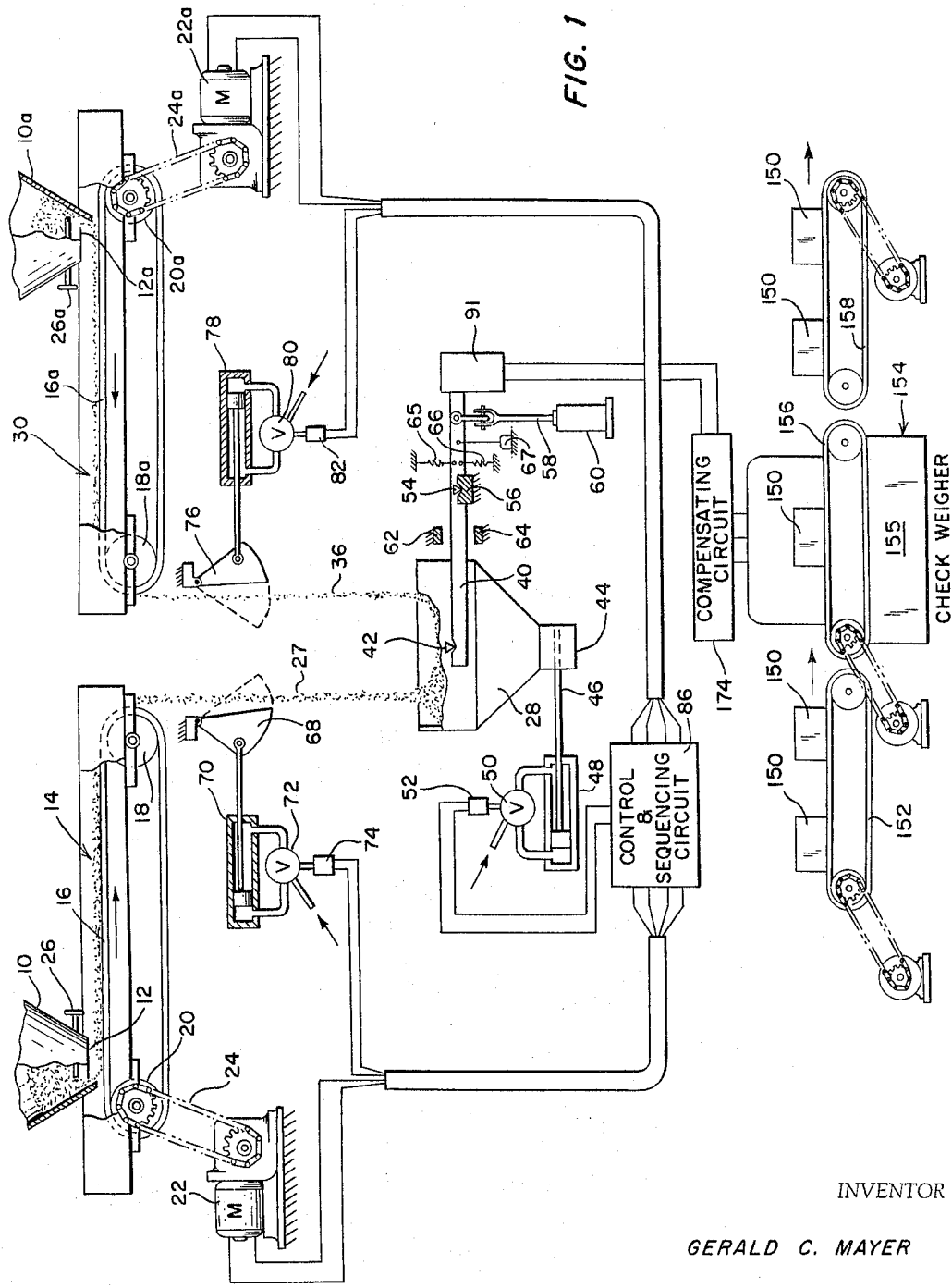
FIGURE 1 is a partially diagrammatic view illustrating an automatic batch weighing apparatus constructed according to one embodiment of the present invention.

Referring now to the drawings and more particularly to FIGURE 1, the automatic batch weighing of this invention comprises a main hopper 10 having a bottom opening 12 for discharging material to be weighed in a layer upon an endless belt, power driven feeder 14 of conventional construction. Feeder 14 has an upper belt flight 16 which is horizontal and which moves from left to right in FIGURE 1 between pulleys 18 and 20. An electric motor drive 22 connected to pulley 20 by an endless chain 24 drives pulleys 18 and 20 at the same constant speed. A discharge gate 26 may be provided to selectively control delivery of material from hopper 10 to feeder 14.

The material passing through the open bottom 12 of hopper 10 is advanced in a layer on the upper belt flight 16 of feeder 14. This material falls off the end of the belt as it passes around pulley 18 and descends in a freely falling continuous column 27 directly into a weigh hopper 28. In this embodiment, feeder 14 is employed to deliver the material to hopper 28 at a full flow rate, and a separate feeder 30 is used to deliver a dribble feed to the weigh hopper.

Feeder 30 preferably is of the same construction as feeder 14. Accordingly, like reference numerals have been employed to identify like parts except that the reference numerals identifying the components of feeder 30 are suffixed with the letter "a."

With the foregoing construction of feeder 30, it will be appreciated that material discharged by hopper 10a and advanced by belt flight 16a to the end of feeder 30 above weigh hopper 28 falls off belt flight 16a as it passes around pulley 18a and descends in a freely falling column 36 directly into weigh hopper 28. Columns 27 and 36 are preferably spaced apart as shown.

In the construction shown in FIGURE 1, the relative position of feeders 14 and 30 are only diagrammatically illustrated, and, in practice, feeder 30 may be positioned beside feeder 14 to provide a more compact assembly. In such case, it is clear that hopper 10a may be an extension or part of hopper 10.

With continued reference to FIGURE 1, hopper 28 is supported from a free weigh beam 40 by a suitable knife edge and load bearing assembly indicated at 42. The bottom of hopper 28 has an opening 44 which is provided with a discharge gate 46 for permitting the discharge of weighed material by gravity. Discharge gate 46 is opened and closed by a suitable fluid motor 48. A valve 50 having a solenoid operator 52 controls the supply and exhaust of fluid for operating motor 48.

Still referring to FIGURE 1, beam 40 is fulcrumed to the right of knife edge assembly 42 by a suitable pivot assembly comprising a knife edge 54 which is fixed to beam 40 and which is seated on a fixed knife edge bearing 56 to provide horizontal fulcrum axis for beam 40. A rod 58 carrying counterweights 60 to balance hopper 28 and the material therein is pivotally suspended from the free end of beam 40 at a distance spaced to the right of the beam fulcrum axis 54, 56 to provide suitable leverage.

The construction of beam 40 just described is conventional and preferably is the same as that described in the aforesaid copending application Serial No. 327,280.

As shown in FIGURE 1, weigh beam 40 is freely swingable about its fulcrum axis between upper and lower closely spaced relatively fixed stops 62 and 64 and occupies a static position between the stops when a predetermined weight in hopper 28 counterbalances weights 60. A pair of helically coiled tension springs 65 and 66 are connected to beam 40 to apply opposing, yieldable forces thereto. The force moments applied by springs 65 and 66 become equal when beam 40 is in its balanced position. Springs 65 and 66 cooperate with a suitable dashpot 67 acting on beam 40 to so control the beam motion that the actual instantaneous position of the beam between rest and static balanced positions lags an instantaneous balancing position by a substantially constant time as fully described in the aforesaid application Serial No. 327,280. Preferably, beam 40, hopper 28, and feeders 14 and 30 are mounted in a suitable casing which is not shown.

With continued reference to FIGURE 1, a pivotally mounted, full-flow catch gate 68 is interposed between feeder 14 and the open top of weigh hopper 28. A suitable fluid motor 70 of conventional form is connected to swing gate 68 about its pivot axis from a position shown in solid lines to the position shown in dotted lines to effectuate immediate interruption of the material flow in column 27. Supply and exhaust of motor operating fluid (such as pressurized air) for operating motor 70 is controlled by a valve 72 having a solenoid operator 74.

For controlling delivery of the dribble feed to hopper 28, a pivotally mounted catch gate 76 (FIGURE 1) interposed between feeder 30 and weigh hopper 28 is swingable about its pivot axis from the position shown in solid lines to a position shown in dotted lines to effectuate immediate cut-off of the dribble feed in column 36. Gate 76 is pivotally displaced between its full and dotted line position by a fluid motor 78 of suitable, conventional form. Motor operating fluid is conveniently supplied from the source supplying motor 70, and supply and exhaust of this operating fluid for operating motor 78 is controlled by a valve 80 having a solenoid operator 82.

Figure 3:
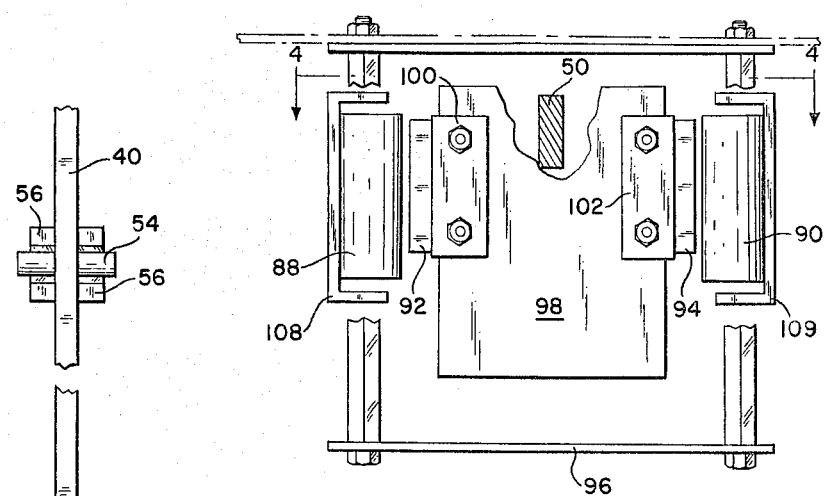
FIGURE 3 is an enlarged, fragmentary end elevation of the assembly shown in FIGURE 2.

As shown in FIGURES 1 and 3, operation of feed motors 22 and 22a and solenoid operators 52, 74 and 82 is controlled by a control and sequencing circuit 86 (FIGURE 1) in response to the actuation of a pair of magnetically-actuatable, mercury-wetted type switches 88 and 90 (FIGURE 3) which form a control unit 91 (FIGURE 1) to be described in greater detail later on. A pair of permanent, axially polarized magnets 92 and 94 (FIGURE 3) fixed to weigh beam 40 respectively actuate switches 88 and 90 at different positions of beam 40.

Figure 2:
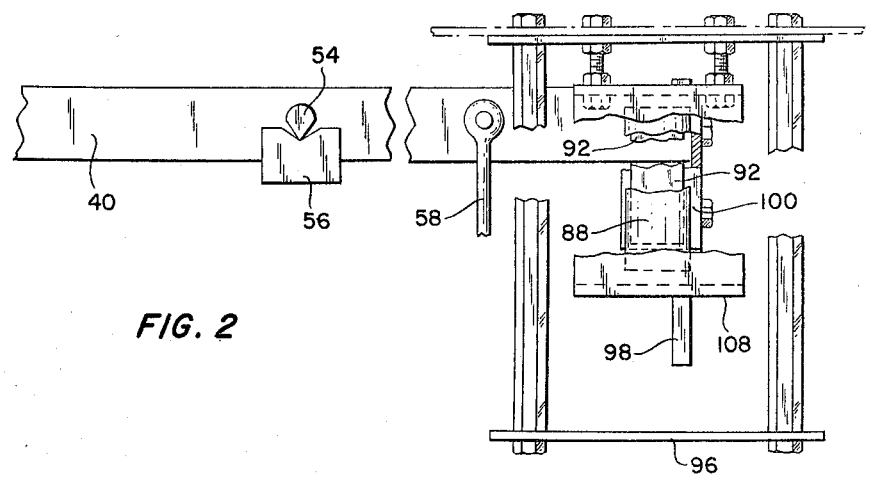
FIGURE 2 is a fragmentary, enlarged side elevation illustrating details of the material feed cut-off unit for controlling the delivery of material to the batch weighing apparatus shown in FIGURE 1.
Figure 4:
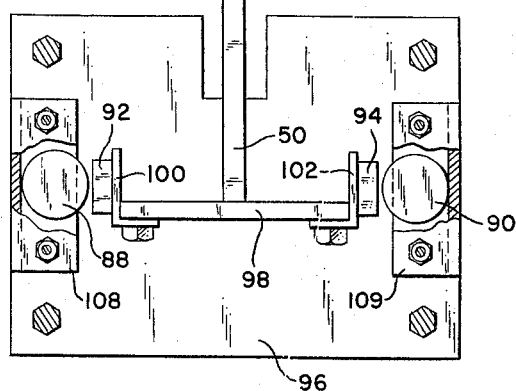
FIGURE 4 is a section taken substantially along lines 4—4 of FIGURE 3.

Referring to FIGURES 2–4, switches 88 and 90 are respectively vertically mounted along parallel longitudinal axes on a rigid, fixed frame 96 which preferably is of the same construction as that disclosed in the aforesaid copending application Serial No. 327,280. Switches 88 and 90 respectively face magnets 92 and 94 which are fixed on opposite sides of a mounting plate 98 by brackets 100 and 102 respectively. Plate 98 is fixed by any suitable means to the free end of weigh beam 40 to the right of the beam fulcrum axis 54, 56. The polarization axes of magnets 92 and 94 are in parallel, upstanding relationship, and when beam 40 is about midway between stops 62 and 64, the polarization axes of magnets 92 and 94 are closely parallel to the longitudinal axes of switches 88 and 90. Switches 88 and 90 are respectively secured to bracket 108 and 109 which may be adjustably mounted for vertical movement on frame 96 in the manner described in the aforesaid copending application Serial No. 327,280.

With the foregoing switch and magnet structure, it is clear that magnets 92 and 94 move as a unit with weigh beam 40 into and out of the vicinity of switches 88 and 90 respectively. Thus, as beam 40 swings upwardly from a rest position on lower stop 64, magnet 92 first passes into the vicinity of and actuates switch 88 to deenergize feeder motor 22 and to swing catch gate 68 to its dotted line position in FIGURE 1 for interrupting the full-flow feed. Following the cut-off of full-flow feed, magnet 94 moves into the vicinity of and actuates switch 94 to stop feeder 30 and to swing catch gate 76 to its feed cut-off position for completing the feeding cycle.

Figure 5:
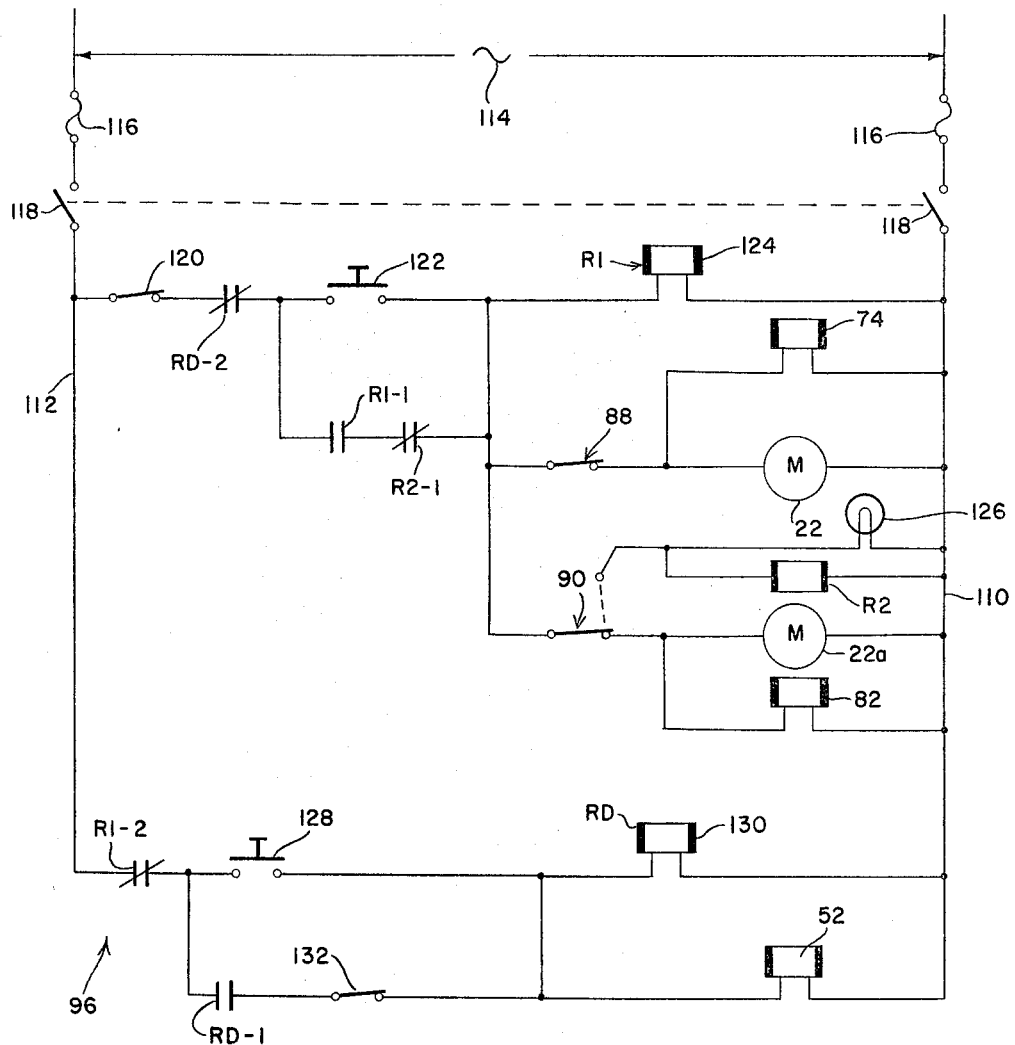
FIGURE 5 is a schematic circuit diagram of the electrical control and sequencing circuit for the batch weighing apparatus shown in FIGURE 1.

Referring now to FIGURE 5, circuit 86 is shown in standby, deenergized condition and comprises a pair of conductors 110 and 112 between which a suitable source 114 of A.C. operating voltage is connected. Current in conductors flows through fuses 116 and a power switch 118. A discharge gate limit switch 120, a spring-loaded pushbutton start switch 122, and a winding 124 of a run relay R1 are connected in series circuit relationship across conductors 110 and 112. Limit switch 120 is actuated to closed and opened positions when discharge door 46 is respectively closed and opened.

To start the feed cycle, switch 122 is depressed with the result that relay R1 will be energized if limit switch 120 is closed, indicating that discharge door 46 is also closed. Energization of relay R1 closes contact R1–1 and opens contact R1–2. Closing of contacts R1–1 establishes a holding circuit around switch 122 and maintains continuity in the network to energize motors 22 and 22a and solenoid operators 74 and 82.

Still referring to FIGURE 5, solenoid operator 74 and motor 22 are connected in parallel across conductors 110 and 112 and in series with contacts R1–1 and switch 88. Thus, when switch 122 is momentarily closed, a circuit for energizing motor 22 and solenoid operator 74 is established through contacts R1–1, a set of normally closed contacts R2–1, and switch 88 which is closed when beam 40 is in its rest position on stop 64.

Similarly, motor 22a and solenoid operator 82 are connected in prallel across conductors 110 and 112 and are in series circuit relationship with contacts R1–1 and switch 90. With beam 40 in its unbalanced, static position on lower stop 64, switch 90 is closed. As a result, motor 22a and solenoid operator 82 will be energized simultaneously with motor 22 and solenoid operator 74 by a circuit traced through contacts R1–1 and R2–1 and switch 90.

Energization of solenoid operators 74 and 82 position their respective valves 72 and 80 to admit pressurized motor operating fluid to motors 70 and 78 for swinging catch gates 68 and 76 to their full line positions shown in FIGURE 1. With feeders 14 and 30 in operation, material will now be delivered to weigh hopper 28.

As hopper 28 fills with material, beam 40 responds by swinging upwardly towards its balanced position shown in FIGURE 1. When the weight of material in hopper 28 approaches the desired preselected weight, beam 40 reaches a position where magnet 92 opens switch 88. This deenergizes motor 22 and solenoid operator 74 to interrupt delivery of materials from feeder 14. However, motor 22a and solenoid operator 82 remain energized to continue the dribble feed in column 36.

When beam 40 approaches its balanced position, magnet 94 opens switch 90, thereby deenergizing motor 22a and solenoid operator 82 to stop feeder 30 and to swing catch gate 76 to its dotted line position shown in FIGURE 1 where it interrupts the delivery of material descending in dribble column 46. Opening of switch 90, as shown in FIGURE 5, completes a circuit for energizing a relay R2 and illuminating a pilot lamp 126 which signals the completion of the feeding cycle. Energization of relay R2 opens contacts R2–1 which interrupts the holding circuit for relay R1.

To discharge the draft of material in hopper 28, a spring-loaded, push-button discharge switch 128, shown in FIGURE 5, is momentarily depressed to establish a circuit for energizing a winding 130 of a discharged relay RD. Winding 130 is connected across conductors 110 and 112 in series with switch 128 and relay contacts R1–2. Contacts R1–2 are normally closed when relay R1 is deenergized, thus assuring that the feeding cycle has been completed before permitting relay RD to be energized by depression of switch 128.

Energization of relay RD closes a set of contacts RD–1 and opens contacts RD–2. Opening of contacts RD–2 prevents energization of solenoid operators 74 and 82 and feed motors 22 and 22a while material is being discharged from hopper 28. By closing contacts RD–1, a holding circuit is established around switch 128 to energize solenoid operator 52. Energization of solenoid operator 52 positions valve 50 to admit pressurized operating fluid to motor 48 for opening discharge door 46 and thereby permitting the draft of material in hopper 28 to be discharged. In series with solenoid operator 52 and contacts R1–2 is a discharge gate limit switch 132 which is opened by opening discharge door 46 to a predetermined position. As a result, solenoid operator 52 will be deenergized to position valve 50 for closing door 46. Preferably, switch 132 has a delayed action to assure that the entire draft in hopper 28 is discharged before interrupting the energizing circuit for solenoid operator 52. By opening switch 132, relay RD is deenergized to close contacts RD–2, thus conditioning circuit for another feeding cycle.

Switches 88 and 90 are vertically adjusted to positions where the weight of the draft fed to hopper 28 at the end of the feeding cycle substantially equal the desired weight which is predetermined by weights 60 on beam 40.

As shown in FIGURE 1, the drafts of material in hopper 28 may be discharged into bags, cartons or other suitable containers indicated at 150 which are transferred by a motor-driven suitable conveyor 152 to a checkweigher 154 having a scale 155 on which a depressible platform 156 comprising a motor-driven conveyor is mounted. Cartons 150 are successively moved one at a time across platform 156 and are post-weighed by checkweigher 154. A motor-driven discharge conveyor 158 of any suitable, conventional form removes cartons 150 after they have been checkweighed.

Checkweigher 154 may be of any suitable standard construction for classifying the drafts in cartons 150 as being within preselected underweight, acceptable weight, or overweight ranges. Such checkweighers normally have an electrical classifying circuit which provides for three separate electrical read-out signals to operate signal lamps, alarms, relays or any combination of these signalling devices for identifying the weight range within which the load or the checkweigher platform falls.

As will become readily apparent as this description proceeds, any suitable, conventional checkweigher providing at least two read-out signals respectively corresponding to underweight and overweight ranges may be employed in conjunction with this invention. Accordingly, the specific, detailed construction of the checkweigher is not essential to provide an understanding of this invention and, as a result, will not be described.

Figure 6:
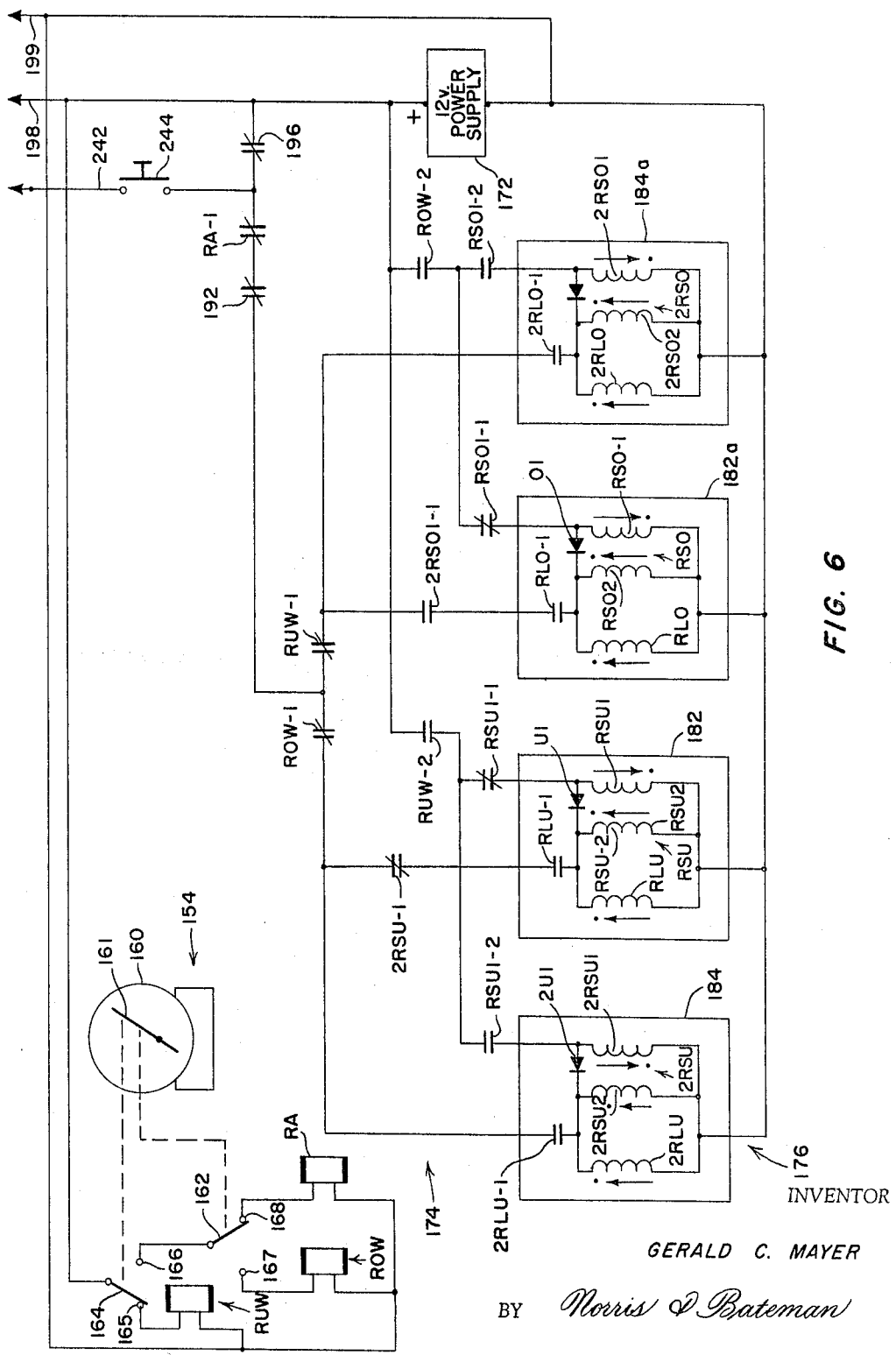
FIGURES 6 and 7 illustrate a schematic electrical circuit diagram of a compensating control circuit for the weighing apparatus shown in FIGURE 1.

As shown in FIGURES 1 and 6, checkweigher 154 for use with this invention may conveniently be provided with a suitable dial 160 having an indicator 161 operatively connected to scale 155 and to a pair of double pole overweight and underweight limit switches 162 and 164 which are connected by suitable linkage to a movable weight indicating part in dial 160.

Switch 164 normally engages a fixed contact 165 when the weight of a load placed on platform 156 of checkweigher 154 is within a pre-selected underweight range. Contact 165 is connected to one winding terminal of an underweight relay RUW. The other winding terminal of relay RUW is connected by a conductor 199 to one side of a suitable operating voltage source 172. Engagement of switch 164 with contact 165 thus completes a circuit for energizing relay RUW.

When the weighment on checkweigher 154 is within an acceptable weight range or overweight range, the switch is moved to engage a further fixed contact 166 to disestablish the energizing circuit for relay RUW and to establish continuity for energizing either an acceptable weight relay RA or an overweight relay ROW through switch 162. Contact 166 is connected to the movable element of switch 162 which is engageable with either one of two fixed contacts 167 and 168. One winding terminal of relay RA is connected to contact 168, and the other winding terminal of relay RA is connected to one side of source 172 through conductor 199. The winding terminals of relay ROW are respectively connected to contact 167 and to conductor 199.

When the weighment on checkweigher 154 is in the underweight range, switch 164 engages contact 164 to prevent completion of a circuit for energizing relays RA and ROW. When the weighment on checkweigher 154 is increased to an acceptable weight range constituting the difference between the upper limit of the underweight range and the lower limit of overweight range, switch 162 is moved to engage contact 166 as previously mentioned. If the load is within the acceptable weight range switch 162 is moved into engagement with contact 168 to complete an energizing circuit for relay RA. If the load is within the overweight range, switch 162 is moved to engage contact 167 to complete an energizing circuit for relay ROW and to dis-establish the energizing circuit for relay RA.

Preferably, switch 164 is actuated to energize relay RUW if the weighment is below 0.5 sigma of the average desired weight, and switch 162 is actuated to energize relay ROW if the weighment is above 0.5 sigma of the average, desired weight. If the weighment on checkweigher 154 is within the acceptable range of ±0.5 sigma, switches 162 and 164 will be actuated to energize relay RA. The term sigma is common to the weighing art and is generally employed to indicate a standard measure of deviation from an average weight value.

Figure 7:
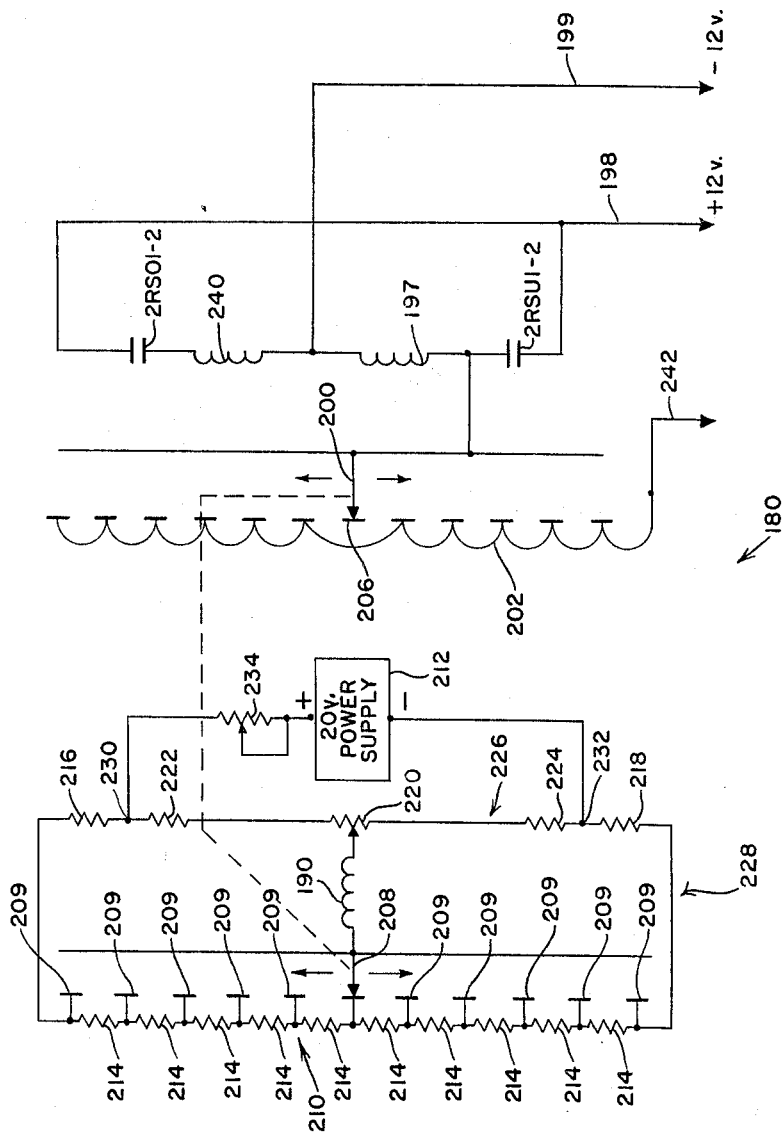

With continued reference to FIGURE 6, relay RUW is provided with a set of normally closed contacts RUW–1 and a set of normally open contacts RUW–2 which are contained in a compensating control circuit 174. Similarly, relay ROW has a set of normally closed contacts ROW–1 and a set of normally open contacts ROW–2 in circuit 174. Circuit 174, as shown in FIGURES 6 and 7, comprises a bi-directional ring counter 176 and a multi-deck, self-interrupting stepper switch mechanism 180 of suitable, conventional form. Ring counter 176 is connected in circuit 174 to count in the number of overweight and underweight drafts detected by checkweigher 154 in a manner to be described in greater detail later on.

With continued reference to FIGURE 6, ring counter 176 comprises a pair of hybrid flip-flop modules 182 and 184 for counting in one direction and a pair of hybrid flip-flop modules 182a and 184a for counting in the opposite direction. In this embodiment, the modules employed in ring counter 176 are of conventional, suitable form and preferably are of the type manufactured by C. P. Clare & Co. and shown on page 11 of the C. P. Clare & Co. application Manual 401. Modules 182 and 184 are connected in counter 176 to count in the number of underweight drafts detected by checkweigher 154, and modules 182a and 184a are connected in counter 176 to count in the number of overweight drafts detected by checkweigher 154. Thus, counter 176 is capable of registering up to +2 corresponding to an overweight direction and to −2 corresponding to an underweight direction. Additional modules may be added to counter 176 if it is desired to increase the counting range.

As will be explained in greater detail shortly, counter 176 will clear or reset when the direction of the pulse received by the counter changes. Thus, if +1 (represented by module 182a) is in register and a lightweight pulse is received, counter 176 will go to −1 (represented by module 182). When two consecutive underweight pulses or two consecutive overweight pulses are received by counter 176, stepper switch mechanism 180 is activated to energize an electro-magnetic coil 190 (see FIGURES 7 and 8) which surrounds the contact elements 192 and 194 of switch 90. If stepper switch mechanism 180 is stepped by a detected overweight trend, the polarity of the energizing current for coil 190 is such that coil 190 will apply a magnetic bias to aid magnet 94 to actuate switch 90 with the result that switch 90 will be actuated by a shorter distance of weigh beam travel in comparison with the distance weigh beam 40 required to move when coil 190 is deenergized. On the other hand, if stepper switch mechanism 180 is stepped by a detected underweight trend, the polarity of the energizing circuit for coil 190 is reversed to apply a magnetic bias which opposes actuation of switch 90. Under these conditions, a greater displacement of beam 40 is required to actuate switch 90. Actuation of switch 90 controls the final cutoff of the dribble feed to hopper 28 as previously explained.

Referring now in greater detail to FIGURE 6, module 182 comprises a set relay RSU having a pair of windings RSU1 and RSU2, and a latch relay having a winding RLU. The magnetic circuits of windings RSU1 and RSU2 are in series opposing relationship with the result that the contacts of the set relay transfer only when one winding is energized. Winding RSU1 is energizable to open a set of normally closed contacts RSU1–1 and to close a set of normally open contacts RSU1–2. Winding RLU is energizable to close a set of normally open contacts RLU–1. Winding RSU1, RSU2, and RLU, contacts RLU–1 and a diode U1 form the circuitry of module 182. Contacts RSU1–1 and RSU1–2 are in the circuitry externally of module 182.

With continued reference to FIGURE 6, winding RSU1 is connected across source 172 in series with contacts RSU1–1 and RUW–2. Winding RSU1–2 and diode U1 are connected in series to form a branch circuit which is in parallel with winding RSU1–1. Winding RLU is shunted across winding RSU–2.

The circuitry of module 184 is the same as that just described for module 182. Accordingly, like reference characters have been used to designate like parts except that each of the reference characters identifying the components of module 184 have been prefixed by the reference numeral "2." As shown, module 184 is connected across source 172 in parallel circuit relationship with module 182.

When a first underweight load is advanced over the platform of checkweigher 154, relay RUW is pulsed to momentarily close normally open contacts RUW–2. Closing of contacts RUW–2 completes a circuit for energizing windings RSU1, RSU2, and RLU in module 182. Energization of winding RLU closes contacts RLU–1 to complete a latching circuit for maintaining winding RSU2 energized. This latching circuit may be traced from one terminal of source 172 through windings RLU and RSU2, through contacts RLU–1, through a set of normally closed contacts 2RSU1–1, through contacts ROW–1 which are closed when the weighment is not in the overweight range, through a first set of normally closed stepper switch interrupter contacts 192, through a set of normally closed contacts RA–1, and through a second set of normally closed, stepper switch interrupter contacts 196 to the other terminal of source 172. Contacts 192, 196, and RA–1 are closed at this stage of the operation.

When windings RSU1 and RSU2 are energized by the pulse received by the counter, the RSU1 coils are energized and the magnetic field cancels. When the pulse is removed, winding RSU1 is deenergized being blocked from RSU2 which remains energized by the diode and the RSU1 contacts will transfer. Contacts RSU1–1 and RSU1–2 are then respectively held open and closed to steer the next pulse to module 184.

If the next load advanced over the platform of checkweigher 154 is also light, the pulse generated by the energization and subsequent deenergization of relay RUW is steered to module 184. When the pulse is terminated, relay 2RSU actuates opening the normally closed contacts 2RSU–1 interrupting the latching circuit for module 182 restoring it to its initial condition.

Winding 2RSU2 is maintained energized, however, through a latching circuit which is completed as a result of energizing winding 2RLU to close contacts 2RLU–1. Like the latching circuit for module 182, the latching circuit for module 184 may be traced from one terminal of source 172, through windings 2RLU and 2RSU2, and through contacts 2RLU–1, ROW–1, 192, 196, and RA–1 to the other terminal of source 172.

As shown in FIGURE 7, module 184 has an external set of normally open contacts 2RSU1–2 which are closed by energizing winding 2RSU1 and which are held closed by maintaining winding 2RSU2 energized through the latching circuit just described. Closing of contacts 2RSU1–2 completes a circuit for energizing a stepper coil 197 of stepper switch mechanism 180. Coil 197 is connected across source 172 by conductors 198 and 199. The circuit for energizing coil 197 may be traced from one terminal of source 172 through conductor 198, through contacts 2RSU1–2, through coil 197, and through conductor 199 to the other terminal of source 172.

With continued reference to FIGURE 7, mechanism 180 is provided with a wiper 200 which is advanceable in either direction to successively engage an endless row of contacts contained in a bank 202. Wiper 200 and bank 202 form one deck of stepper switch mechanism 180. As shown, wiper 200 is normally at a home position where it engages a center contact 206 before operation of the control system described herein is initiated. Contact 206 is electrically insulated from the rest of the circuit.

Energization of coil 197 as a result of closing contacts 2RSU1–2 opens interrupter contacts 196 to interrupt the latching circuit maintaining windings 2RLU and 2RSU2 in module 184. Deenergization of winding 2RSU2 opens contacts 2RSU1–2 to interrupt the energizing circuit for coil 197 with the result that coil 197 is pulsed. Pulsing of coil 197 advances wiper 200 from contact 206 to the adjacent, lower contact in bank 202. Deenergization of coil 197 as a result of opening contacts 2RSU1–2 holds wiper 200 at this position.

Still referring to FIGURE 7, stepper switch mechanism 180 is provided with a second wiper 208 which ganged to wiper 200 and which is advanceable in unison with wiper 200 to successively engage a series of contacts 209 contained in a bank 210. Wiper 208 and bank 210 form a second deck of stepper switch mechanism 180.

With continued reference to FIGURE 7, contacts 209 are connected in series across a suitable D.C. source of operating voltage indicated at 212. Connected in series between adjacent ones of contacts 209 are voltage dropping resistors 214 having equal resistances. Voltage dividing resistors 216 and 218 are connected in series with contacts 209 on opposite sides of source 212.

Still referring to FIGURE 7, wiper 208 is connected to one terminal of coil 190. The other terminal of coil 190 is connected to the wiper of a variable resistor 220. Resistor 220 is series connected at its opposite terminals to fixed resistors 222 and 224 to form a branch circuit indicated at 226. One terminal of branch circuit 226 is connected to the terminal of resistor 216 which is connected to source 212. The other terminal of branch circuit 226 is connected to the terminal of resistor 218 which is connected to source 212.

From this circuitry it will be appreciated that bank 210 is connected together with branch circuit 226 in the form of a Wheatstone bridge 228 having input terminals indicated at 230 and 232 to which power is supplied from source 212. The output terminals of bridge 228 constitute the wiper engagement point of variable resistor 220 and the contact in bank 210 which is engaged by wiper 208. Thus, coil 190 is connected as a branch circuit between the output terminals of bridge 228.

A variable resistor 234 connected to source 212 is adjustable to selectively vary the voltage applied to bridge 228. The value of resistors 216 and 218 and of resistors 222 and 224 are preferably equal so that engagement of wiper 208 with the center contact in bank 210 establishes a balanced bridge condition. Resistor 234 is adjustable to selectively balance bridge 228.

When wiper 200 engages contact 206, wiper 208 is positioned to engage the center contact in bank 210 to establish a balanced bridge condition. As a result, no voltage differential will appear at the output terminals of bridge 228 for energizing coil 190. When two consecutive underweight drafts are detected by checkweigher 154, however, a count of −2 is received by counter 176 to activate module 184 and thereby pulse stepper coil 197 to advance wiper 200 to the lower, adjacent contact in bank 202. Wiper 208, which is ganged to wiper 200, is thus advanced in a downward direction from its bridge balancing position shown in FIGURE 7 to engage the next lower contact in bank 210. Under these conditions, direct current now flows through coil 190 in such a direction as to produce a magnetic field to oppose the magnetic bias exerted by magnet 94 for actuating switch 90. Thus, in comparison with the condition where coil 190 is de-energized, magnet 94 is required to be advanced closer to switch 90 before it is able to overcome the opposing bias applied by energizing coil 190 and thereby actuate switch 90. This requires a greater angular displacement of beam 40 in comparison with the beam displacement needed when coil 190 was de-energized. As a result, the final cut-off of the dribble feed to hopper 28 is delayed to produce a heavier weighing.

If the next moving load weighed out by checkweigher 154 after coil 190 is energized is still light, relay RUW is again pulsed by switch 164 to momentarily close contacts RUW–2. Since contacts RSU1–1 and RSU1–2 are respectively closed and opened at this stage, the counter actuating pulse is steered to module 182, and the operation previously described for conditioning counter 176 to steer the next actuating pulse to module 184 is repeated. It will be appreciated that stepper coil 197 is not pulsed to advanced wipers 200 and 208 when the counter actuating pulse is steered to module 182.

In the event the fourth moving load checked out be check-weigher 154 is also in the underweight range, contacts RUW–2 are again closed as a result of momentarily energizing relay RUW and the counter actuating pulse is steered to module 184. By energizing windings 2RSU1, 2RSU2, and 2RLU again, coil 197 is pulsed to advance wipers 200 and 208 to the next lower contacts in banks 202 and 210 respectively. Thus, the voltage differential across the output terminals of bridge 228 is increased, and the resulting increase in energizing current for coil 190 produces a corresponding increase in the magnetic field opposing actuation of switch 90 by magnet 94. This condition requires beam 40 to be angularly displaced a still greater distance to effect actuation of switch 90 and interruption of the dribble feed to hopper 28. As a result, a still heavier weighment will be produce when stepper coil 197 is pulsed for the second time.

If the drafts discharged from hopper 28 continue to be light, the foregoing sequence is repeated to increase the magnetic field opposing actuation of switch 90 by magnet 94 each time wiper 208 is advanced toward the lower end of bank 210. When wiper 208 reaches the lowest contact in bank 210 shown in FIGURE 7, an alarm (not shown) may be actuated to alert the operator that the system has reached the limit of its compensative adjustment.

As shown in FIGURE 6, the circuitry for modules 182a and 184a and their connections in circuit 174 are the same as modules 182 and 184. Accordingly, like reference characters have been used to designate like components for modules 182a and 184a except that the letter "U" has been replaced with the letter "O."

If a heavy or overweight load is detected by checkweigher 154, switches 162 and 164 are actuated during the interval when the moving load is advancing over the platform of check-weigher 154 to complete a circuit for momentarily energizing relay ROW. As a result, a counter actuating pulse from source 172 is steered through normally closed contacts RSO1–1 to energize windings RSO1, RSO2, and RLO in module 182a. The first pulse indicating an overweight condition and received by counter 176 does not energize the windings in module 184a since contacts RSO1–2 are normally open.

Energization of winding RLO closes contacts RLO–1 to complete a latching circuit for maintaining winding RSO2 energized. This latching circuit may be traced from one terminal of source 172, through windings RLO and RSO2, through contacts RLO–1 which are now closed, through normally closed contacts 2RSO1–1 through contacts RUW–1, which are closed as a result of applying a load in the overweight range to the platform of checkweigher 154, and through normally closed contacts 192, 196, and RA–1, to the opposite terminal of source 172.

When the RSO1 coils are energized, the magentic field cancels. When the pulse is removed, winding RSO1 is deenergized and is blocked from winding RSO2 which remains energized by diode 01 with the result that contacts of set relay RSO will transfer. Contacts RSO1–1 and RSO1–2 are then respectively held open and closed to steer the next pulse to module 184a.

If the next load moving across the platform is also overweight, contacts ROW–2 are closed during the interval that the load is applied to checkweigher 154 to again complete a circuit for pulsing counter 176. This pulse is now steered to module 184a to energize windings 2RSO1, 2RSO2, and 2RLO.

Energization of winding 2RLO closes normally open contacts 2RLO–1 to complete a latching circuit for maintaining winding 2RSD2 energized. Energization of winding 2RSO1 opens normally closed contacts 2RSO1–1 which interrupt the latching circuit for maintaining winding RSO2 energized. As a result, winding RSO2 de-energizes to allow contacts RSO1–2 to open and contacts RSO1–1 to close. Opening of contacts RSO1–2 interrupts the energizing circuit for winding 2RSO1. Winding 2RSO2, however, is maintained energized through the latching circuit which was completed by closing contacts 2RLO–1.

Enerization of winding 2RSO1 also closes a set of normally open contacts 2RSO1–2 (FIGURE 7) to complete a circuit for energizing a second stepper switch coil 240.

The energizing circuit for coil 240 may be traced from one terminal of source 172, through conductor 198, through contacts 2RSO1–2, coil 240, and through conductor 199 to the other terminal of source 172. Energization of coil 240 as a result of closing contacts 2RSO1–2 opens interrupter contacts 192 to interrupt the latching circuit maintaining windings 2RLO and 2RSO2 energized in module 184a. De-energization of winding 2RSO2 opens contacts 2RSO1–2 to interrupt the energizing circuit for coil 240 with the result that coil 240 is pulsed. Pulsing of coil 240 advances wiper 200 upwardly as viewed from FIGURE 7. Assuming that wiper 200 is in engagement with contact 206, pulsing of coil 240 advances wiper 200 to the next adjacent contact in bank 202. De-energization of coil 240 as a result of opening contacts 2RSO1–2 holds wiper 200 at this position.

Wiper 208, which is ganged to wiper 200 as previously explained, is thus advanced in an upward direction from its bridge balancing position shown in FIGURE 7 to engage the next upper contact in bank 210. Under these conditions, direct current will now flow through coil 190 in such a direction as to produce a magnetic field which aids magnet 94 to actuate switch 90. Switch 90 thus will be actuated by magnet 94 when beam 40 has moved through a distance which is less than the distance of beam movement required when coil 190 was de-energized. As a result, the final cut-off of the dribble feed to hopper 28 is advanced to make the next weighing lighter.

From the foregoing, it is clear that direct current is passed through coil 190 in a one direction to produce a magnetic field which opposes actuation of switch 90 by magnet 94 when wiper 208 is advanced downwardly from its null position to unbalance bridge 228. When wiper 208 is advanced in the opposite direction from its bridge balancing position, the current flowing through coil 190 is reversed in polarity to produce a magnetic field that aids magnet 94 in the actuation of switch 90.

In the event a third consecutive weighment is also heavy, module 182a is again activated to condition counter 176 for steering the next overweight pulse to module 184a. Thus when the fourth consecutive weighment is also overweight, module 184a is activated to pulse coil 240 and thereby advances wiper 208 upwardly to the next contact in bank 210 so that it is spaced from its bridge balancing position by two contacts to increase the voltage differential across the output terminals of bridge 228. If the weight of the loads detected by checkweigher 154 continue to be overweight, wiper 208 is advanced one contact for every other consecutive overweight load until it reaches the last contact at the upper end of bank 210 as viewed from FIGURE 7. An alarm (not shown) may be sounded at this time to alert the opertaor as previously described.

If a load weighed out by checkweigher 154 is within the acceptable weight range, switches 162 and 164 are actuated to energize relay RA. Energization of relay RA opens normally closed contacts RA–1 to clear counter of any previous entry. If the next load in succession is underweight, module 182 is activated to condition counter 176 for steering the next pulse to module 184 as previously explained. At this stage, it will be recalled that neither coil 197 nor coil 240 is pulsed.

If the third load advanced in succession over the platform of checkweigher 154 is overweight, contacts ROW–1 momentarily open as a result of momentarily energizing relay ROW to interrupt the latching circuit for maintaining winding RSU2 in module 182 energized. In addition, contacts RUW–2 open and contacts ROW–2 close to steer the counter actuating pulse to module 182a for conditioning counter 176 to steer the next pulse to module 184a. If, however, the fourth load is within the acceptable range, contacts RA–1 open to interrupt the latching circuit for module 182a and reset counter 176.

When bridge 228 is unbalanced by advancement of wiper 208 to a position where coil 190 is energized to apply an opposing bias and two consecutive light loads are detected by checkweigher 154, coil 240 is pulsed to advance wiper 208 toward its bridge balancing position. This displacement of wiper 208 reduces the opposing bias exerted by coil 190 or de-energizes coil 190 depending on the original position of wiper 208 to permit magnet 94 to actuate switch 90 with a smaller movement of beam 40.

To reset wipers 200 and 208 to the positions shown in FIGURE 7, a conductor 242 connects the contacts in bank 202 in series to one terminal of a spring-load pushbutton switch 244. The other terminal of switch 244 is connected through contacts 196 to the positive terminal of source 172. Wiper 200 is connected through contacts 2RSU1–2 to conductor 198.

When wiper 200 is in engagement with one of the contacts in bank 202 other than contact 206 and switch 244 is closed, a circuit is completed to energize coil 197 to advance wipers 200 and 208 to the next contacts in their respective banks. By repeatedly closing switch 244, therefore, wipers 200 and 208 may be stepped around the contacts in banks 202 and 210.

Figures 8, 9:
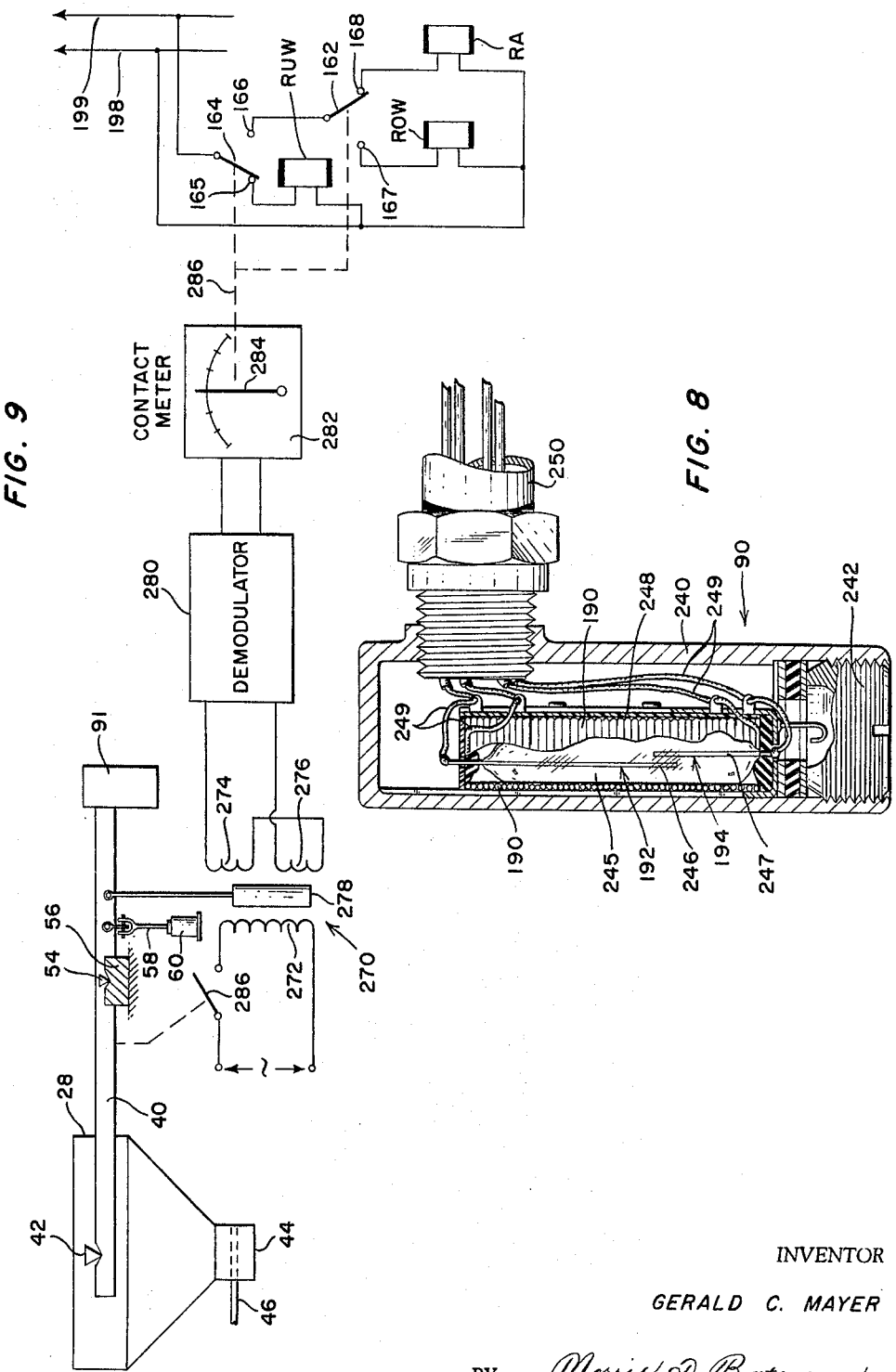
FIGURE 8 is an enlarged partially sectioned elevation of the one of the switch assemblies shown in FIGURE 3 with part of the casing being broken away to show interior details.
FIGURE 9 illustrates a fragmentary elevation of modified weight-checking apparatus for detecting deviations of the weighments from a pre-selected weight range.

As shown in FIGURE 8, switch 90 comprises a hollow tubular-shaped casing 240 that is open at one end and closed at the other. The open end of casing 240 is internally threaded to receive a sealing plug 242. Removably mounted within casing 240 is a bracket assembly 244 which supports a capsule 245. Contact element 192 comprises a reed-type, magnetically biasable spring leaf 246 which is cantilever mounted at one end of capsule 245 and which extends longitudinally within the capsule. Contact element 194 comprises a rigid rod-like member 247 which is fixed to the opposite end of capsule 245 and which extends longitudinally within the capsule in normally laterally spaced relation to the adjacent free end of contact element 192. When beam 40 is moved to a position where switch 90 is influenced by magnet 86, the magnetic field deflects the free end of contact element 192 to electrically engage contact element 194.

With continued reference to FIGURE 8, contact elements 192 and 194 are provided with exterior terminal posts which are connected to terminals on an electrically insulated terminal board 248 which is mounted by bracket assembly 244 in casing 240. Conductors generally indicated at 249 are connected to the terminals on board 248 and extend through a suitable cable 250 to terminal points in the control circuit.

Coil 190 is wrapped tightly around capsule 245 and when energized with currents of opposite polarities will respectively aid or resist deflection of leaf 246 by the magnetic bias exerted by magnet 86. The terminals of coil 190 are connected by suitable conductors through terminals on board 248.

Referring now to FIGURE 9, check weigher 154 is shown to be replaced with a differential transformer 270 which conventionally comprises a primary winding 272 and a plurality of secondary windings 274 and 276. The terminals of winding 272 are connected across a source of A.C. operating voltage. A movable armature 278 forming a part of transformer 270 is fixed to weigh beam 40 for movement therewith.

With continuing reference to FIGURE 9, secondary windings 274 and 276 are operatively connected to a conventional demodulator 280 for converting A.C. current to D.C. current. The D.C. output of demodulator 280 is connected to input terminals of a millivolt contact meter 282 of any suitable, conventional form. Meter 282 is provided with a movable indicator 284 which is connected by motion transmitting linkages indicated at 286 to switches 162 and 164.

When the weight of the draft accumulated in hopper 28 is within an acceptable weight range, beam 40 shifts armature 278 to a null or zero position at which equal voltages are induced into secondary windings 274 and 276. When weight beam 40 is in a position corresponding to an overweight or underweight condition, armature 278 is moved in either direction from its zero setting to increase the voltage in one of the secondary windings and to decrease the voltage in the other of the secondary windings of transformer 270. Under these conditions, meter 282 is activated through demodulator 280 to displace indicator 284 in one direction or the other. Displacement of indicator 284 in an overweight and underweight direction actuates switches 162 and 164 to operate counter 176 in the manner previously described. A switch 286 connected in series with winding 272 prevents generation of signals in secondary windings 274 and 276 until beam 40 reaches a static balanced position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a pre-weighing apparatus for weighing out discrete measured drafts of material, means for delivering material to said apparatus, checking weighing means for detecting deviations in the weights of said drafts from a pre-selected weight range, and means controlling the cutoff of material being delivered to said apparatus and being responsive to the detection of weight deviations by said check weighing means for compensatively adjusting the amount delivered to said pre-weighing apparatus only when said check weighing means detects weight deviations in the same direction from said range in a plurality of consecutive weighed-out drafts.

2. A weighing apparatus comprising scale means having a fulcrumed weigh beam counterweighted to balance a predetermined weight of material fed to said scale means, means for feeding successive measured drafs of material to said scale means, sensing means for detecting predetermined deviations in the weight of each draft from said predetermined weight, and means under the control of said weigh beam for controlling the cutoff of material feed to said scale means and being responsive to a predetermined number of weight deviations detected in predetermined order by said sensing means for adjusting the amount of material fed to said scale means to compensate for said deviations.

3. A batch weighing apparatus comprising a receptacle, means for delivering material to said receptacle, a counterweight fulcrumed weigh beam assembly operatively connected to said receptacle to balance a predetermined weight of material accumulated in said receptacle, means for delivering successive drafts of material to said receptacle and including a switch actuated by predetermined balancing movement of said beam assembly to cut off delivery of material to said receptacle, sensing means for detecting weight deviations of each draft from a preselected weight range, and means responsive to said deviations for so applying a force to said switch as to compensate for said deviations.

4. The weighing apparatus defined in claim 3 wherein said means responsive to said deviations comprises means for aiding beam actuation of said switch when deviations are in an overweight direction and for resisting beam actuation of said switch when said deviations are in an underweight direction.

5. The weighing apparatus defined in claim 3 wherein said means responsive to said deviations comprises a current sensitive element, means under the control of said sensing means for energizing said element with a D.C. current of one polarity when a predetermined number of consecutive drafts having weights deviating in the same direction from said range are detected and for energizing said element with D.C. current of opposite polarity when a predetermined number of consecutive drafts having weights deviating in the opposite direction from said range, the energization of said current sensitive element by currents of opposite polarities being effective to respectively assist and resist actuation of said switch.

6. The weighing apparatus defined in claim 5 wherein said current sensitive element comprises a coil energizable to apply a magnetic bias to said switch.

7. The weighing apparatus defined in claim 6 wherein said switch is magnetically actuated.

8. The weighing apparatus definel in claim 6 comprising means for progressively increasing the current flow through said coil in either direction when weight deviations in the same direction continue to be detected in predetermined numbers of consecutive drafts.

9. The weighing apparatus defined in claim 3 wherein said sensing means comprises check weighing means operative to produce separate signals for overweight and underweight deviations from said range, and wherein said means responsive to said sensing means comprises a bi-directional ring counter operatively connected to said check weighing means to count in opposite directions respectively in response to overweight signals and underweight signals produced by said check weighing means, and means responsive to predetermined counts registered in opposite directions in said counter to respectively assist and resist actuation of said switch by beam movement.

10. The weighing apparatus defined in claim 9 wherein said means for assisting and resisting actuation of said switch comprises a coil, means for energizing said coil with D.C. current, a circuit including a stepper switch actuated in response to registration of said predetermined counts for controlling the polarity and magnitude of the coil energizing current, said coil being disposed to apply a magnetic bias to said switch to aid or resist switch actuation.

11. The weighing apparatus defined in claim 3 wherein said sensing means comprises a differential transformer having an armature movable with said weigh beam for producing overweight and underweight signals, said means responsive to said deviations comprising means responsive to said overweight and underweight signals for respectively assisting and resisting actuation of said switch by beam movement.

12. A weighing apparatus comprising a receptacle, means for delivering material to said receptacle, a fulcrumed weigh beam assembly operatively connected to said receptacle and being counterweighted to balance out a predetermined weight of material accumulated in said receptacle, means for delivering successive drafts of material to said receptacle, means responsive to balancing movement of said beam assembly in overweight and underweight directions relative to a beam position corresponding to said predetermined weight for respectively producing overweight and underweight signals, and means controlling the cutoff of material delivered to said receptacle and being responsive to said signals for so adjusting the amount of material delivered to said receptacle as to compensate for the deviations from said predetermined movement.

13. A weighing apparatus comprising a receptacle, means for delivering material to said receptacle, a fulcrumed weigh beam assembly operatively connected to said receptacle and being counterweighted to balance out a predetermined weight of material accumulated in said receptacle, means for delivering successive discrete drafts of material to said receptacle and including a switch actuated by predetermined movement of said beam assembly to cut off delivery of material to said receptacle, means including a differential transformer having an armature movable in repsonse to displacement of said beam to produce signals corresponding to movement of said beam assembly in overweight and underweight directions relative to a position corresponding to said predetermined weight, and means responsive to said signal for so resisting or assisting beam actuation of said switch as to compensate for said deviations.

14. A weighing apparatus comprising a receptacle, a fulcrumed weigh beam operatively connected to said receptacle and being counterweighted to balance a predetermined weight of material accmulated in said receptacle, means for delivering material to said receptacle in successive drafts and including means controlled by beam movement for cutting off delivery of material to said receptacle and further means controlling said material cutoff means and being responsive to beam movement for so adjusting the amount of material delivered to said receptacle as to compensate for predetermined weight deviations from said predetermined weight.

15. A weighing apparatus comprising a weigh hopper, means for feeding material to said hopper in a falling stream, a counterweighted fulcrumed weigh beam operably connected to said hopper and being deflectable toward a balanced position by accumulation of material in said hopper, gate means interposed between said feeding means and said hopper and being actuatable to cut off the feed of material to said hopper, means responsive to deflection of said beam to a predetermined position for actuating said gate means, sensing means for detecting deviations of the weight of each draft of material delivered to said receptacle from a pre-selected weight range, and means responsive to said sensing means for so controlling said gate actuating means as to compensate for detected weight deviations only in response to the detection of weights deviating in the same direction from said range in a plurality of consecutive drafts.

16. The weighing apparatus defined in claim 15 wherein said means for actuating said gate means comprises magnetically actuatable switch means, magnetic means, means for mounting said switch means and said magnetic means for relative displacement by deflection of said weight beam to actuate said switch means upon predetermined deflection of said weigh beam, and means under the control of said switch means for actuating said gate means, said adjusting means comprising a current sensitive element for applying a magnetic bias to at least one of the contacts of said switch means, means for energizing said current sensitive element with D.C. operating current, and means for controlling the polarity and magnitude of said operating current in response to weight diviations detected by said sensing means to resist or assist actuation of said switch means by said magnetic means.

17. The weighing apparatus defined in claim 4 wherein said means for controlling the polarity and magnitude of said operating current comprises a circuit in the form of a bridge having a pair of input terminals connected across a sourse of D.C. operating voltage, a branch circuit connected between said input terminals and having a plurality of series connected resistors providing a bank of output terminals, resistor means connecting one terminal of current sensitive element to said input terminals, and means under the control of said sensing means for connecting the other terminal of said current sensitive element to successive ones of said output terminals when weight deviations in the same direction are detected in at least two consecutive drafts.

18. The batch weighing apparatus defined in claim 3 wherein said means for delivering successive drafts of material further comprises a cutoff gate and means operated by actuation of said switch to displace said cutoff gate to a position where it interrupts delivery of material to said receptacle.

References Cited by the Examiner

UNITED STATES PATENTS

| | | | |
|---|---|---|---|
| 2,597,831 | 5/1952 | Willis | 177—108 |
| 2,634,082 | 4/1953 | Knobel | 177—116 |
| 2,829,856 | 4/1958 | Gregory | 177—122 |
| 2,889,030 | 6/1959 | Mottet | 177—60 X |
| 2,954,202 | 9/1960 | Bale | 177—122 X |
| 3,108,647 | 10/1963 | Harmon et al. | 177—1 |
| 3,116,801 | 1/1964 | Bauder et al. | 177—1 |
| 3,141,515 | 7/1964 | Dietert et al. | 177—116 |

RICHARD B. WILKINSON, *Primary Examiner.*

STEPHEN J. TOMSKY, *Examiner.*